United States Patent

Takeshita

Patent Number: 5,271,475
Date of Patent: Dec. 21, 1993

[54] POWER STEERING SYSTEM WITH IMPROVED MEANS FOR WARNING OF MALFUNCTION

[75] Inventor: Toshimi Takeshita, Atsugi, Japan

[73] Assignee: Unisia Jecs Corpporation, Atsugi, Japan

[21] Appl. No.: 12,127

[22] Filed: Feb. 1, 1993

[30] Foreign Application Priority Data

Feb. 4, 1992 [JP] Japan .................. 4-003722[U]

[51] Int. Cl.$^5$ ............................................. B62D 6/00
[52] U.S. Cl. ................................. 180/79.1; 180/133
[58] Field of Search ................... 180/79.1, 133, 142; 280/432; 364/424.05

[56] References Cited

U.S. PATENT DOCUMENTS

| | | | |
|---|---|---|---|
| 4,293,051 | 10/1981 | Nishikawa | 180/133 |
| 4,476,677 | 10/1984 | Hanshaw | 180/133 X |
| 4,624,335 | 11/1986 | Shiraishi et al. | 180/133 X |
| 4,972,133 | 11/1990 | Hirota et al. | 180/79.1 X |
| 5,065,325 | 11/1991 | Takahashi | 364/424.05 |
| 5,101,922 | 4/1992 | Ohmura | 180/79.1 |

FOREIGN PATENT DOCUMENTS

| | | | |
|---|---|---|---|
| 0337645 | 10/1989 | European Pat. Off. | 180/79.1 |
| 62-118782 | 7/1987 | Japan . | |
| 0081769 | 3/1990 | Japan | 180/79.1 |
| 2066185 | 7/1981 | United Kingdom | 180/133 |

*Primary Examiner*—Margaret A. Focarino
*Assistant Examiner*—Carla Mattix
*Attorney, Agent, or Firm*—Foley & Lardner

[57] ABSTRACT

A power steering system is provided which, upon malfunction thereof, causes a warning lamp to be turned on or turned on and off alternately and produces a cyclically varying steering assist force for causing vibrations of a steering wheel so that a warning to the driver against the malfunction is given not only by the lighting of the warning lamp but by the vibrations of the steering wheel.

8 Claims, 2 Drawing Sheets

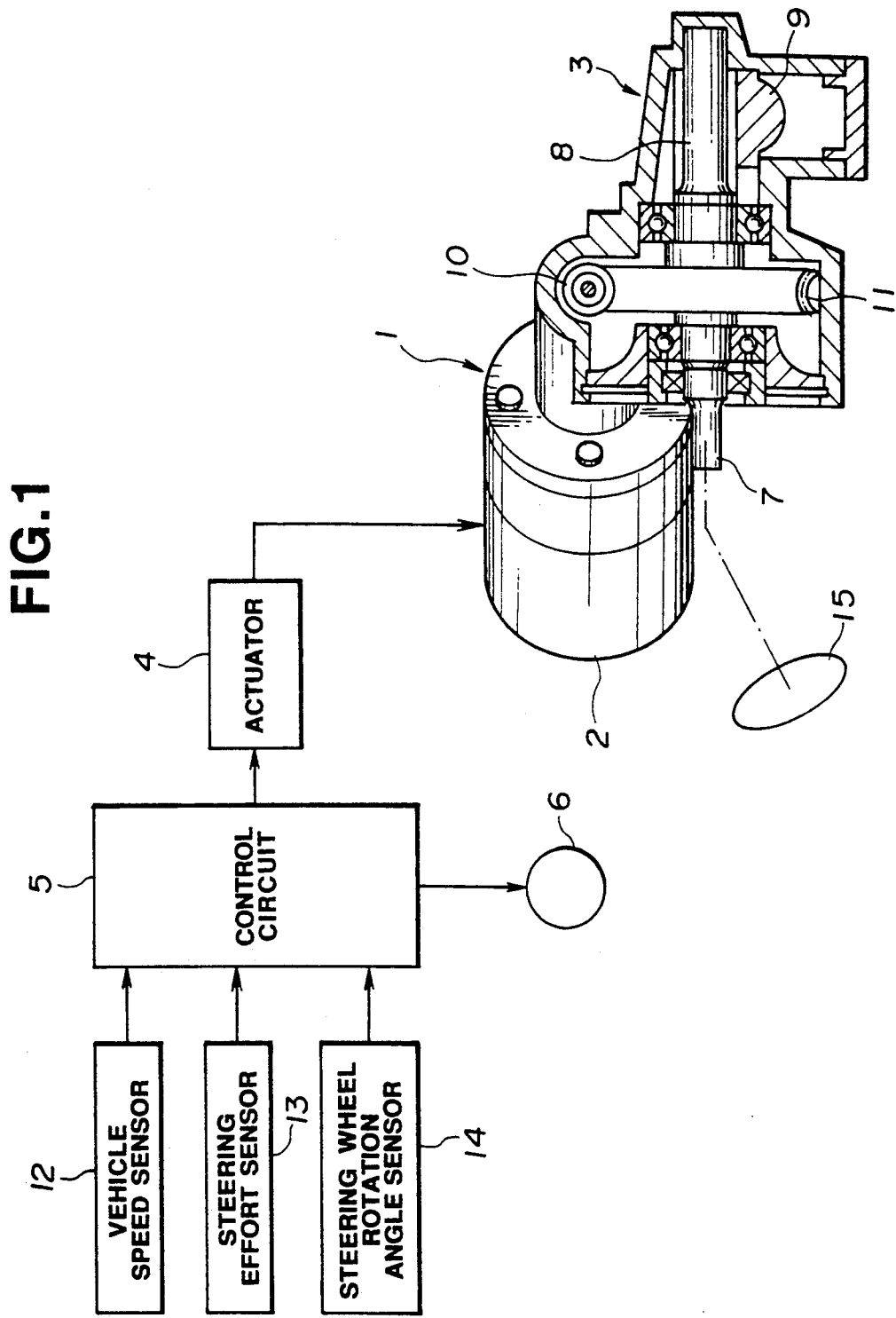

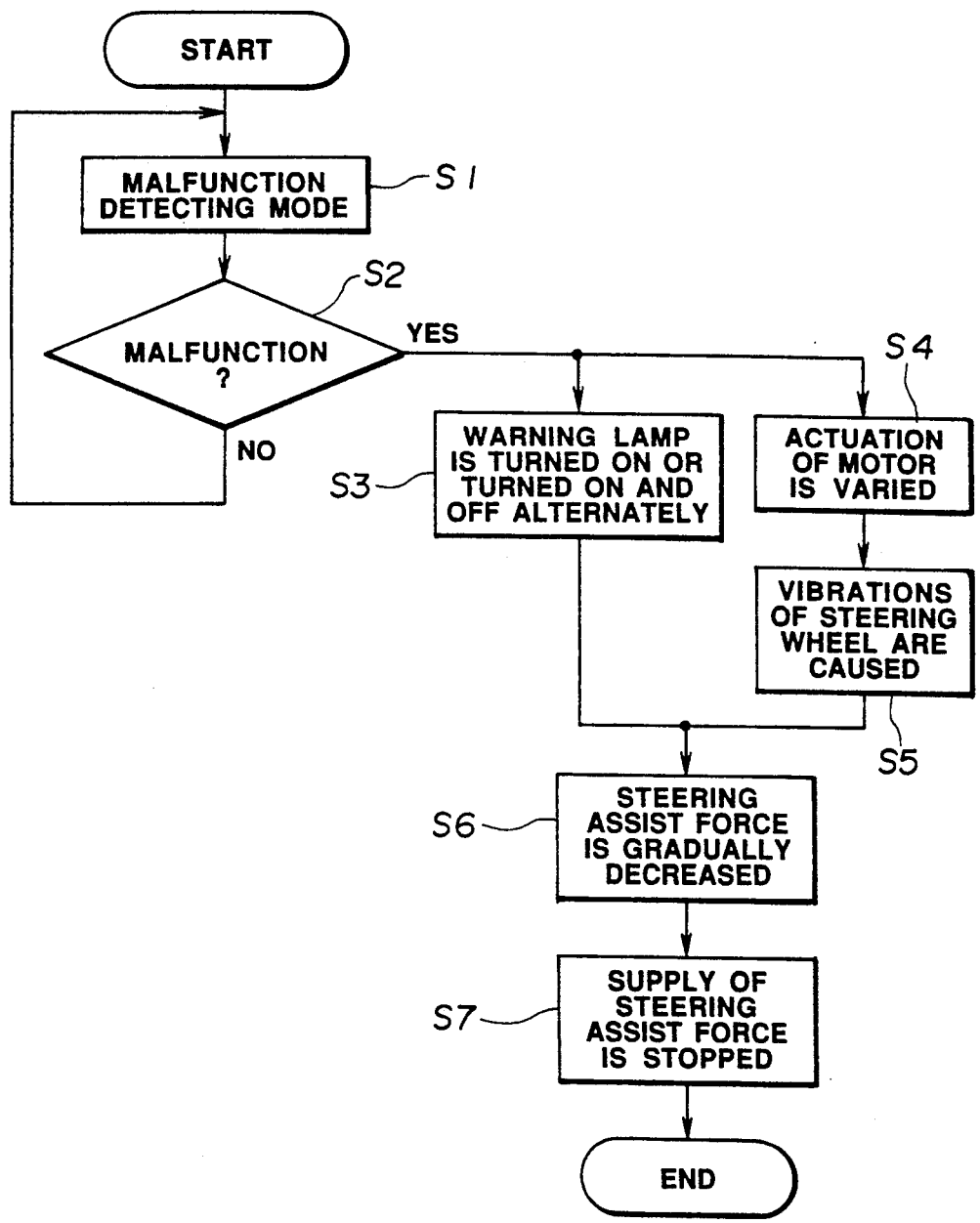

POWER STEERING SYSTEM WITH IMPROVED MEANS FOR WARNING OF MALFUNCTION

BACKGROUND OF THE INVENTION

1. Field of the Invention

The present invention relates in general to power steering systems for automotive vehicles and more particularly to a power steering system of the type having a fail-safe mechanism.

2. Disclosure Information

A power steering system of the type having such a fail-safe mechanism is disclosed in Japanese Utility Model Provisional Publication No. 62-118782 for instance. This power steering system includes a means for detecting a steering torque or effort applied to a steering gear by way of a steering wheel, a steering assist force transmitting means connected to the steering gear for supplying thereto a steering assist force, and a control means for controlling increase and decrease of a steering assist force to be produced by an electric motor in accordance with an output signal from the steering effort detecting means, whereby when the average of the detected steering efforts becomes larger than a predetermined value under a straight-ahead vehicle running condition, the system determines that a malfunction has occurred and gives warning to the driver. After issuance of the warning, the fail-safe mechanism is put into action for reducing the steering assist force (assist gain) produced by the electric motor.

With the prior art power steering system, the warning to the driver is given by means of a warning lamp or by a device for producing a warning sound. However, there is a possibility that such warning is overlooked by the driver when, for example, his attention is being attracted to the outside of the vehicle or he is listening to the stereo. In such a case, the driver shall feel from the next time of steering operation and onward that the turning operation of the steering wheel has unexpectedly changed to require a more effort, i.e., the operation feel of the steering wheel has unexpectedly changed heavier and therefore the operation feel has become worse, inevitably leading to deterioration of its image or reputation as a merchandise.

SUMMARY OF THE INVENTION

In accordance with the present invention, there is provided an improved power steering system which comprises a steering gear to which a steering effort is applied by way of a steering wheel, assist power source means connected to the steering gear for supplying thereto a steering assist force for thereby multiplying the steering effort, detector means for detecting the steering effort applied to the steering gear by way of the steering wheel and producing a signal representative thereof, control means connected to the assist power source means and the detector means for controlling increase and decrease of the steering assist force in response to the signal from the detector means and having means for detecting a malfunction of the steering gear and the assist power source means, and warning means connected to the control means for issuing a warning upon detection of the malfunction by the control means, wherein the control means has a control mode for causing the assist power source means to produce a cyclically varying steering assist force upon detection of the malfunction so that the cyclic variation of the steering assist force is transmitted to the steering wheel and thereafter causing the steering assist means to produce a gradually decreasing steering assist force.

This structure is effective for solving the above noted drawbacks or shortcomings inherent in the prior art system.

It is accordingly an object of the present invention to provide an improved power steering system which can assuredly make the driver notice a warning on the fact that a malfunction has occurred and its fail-safe mechanism is going to be put into action.

It is a further object of the present invention to provide an improved power steering system of the above described character which is desirable from a safety driving point of view.

BRIEF DESCRIPTION OF THE DRAWINGS

FIG. 1 is a partly sectional view of a power steering system according to an embodiment of the present invention, with a diagrammatic representation of a control section; and FIG. 2 is a flow chart showing a control routine performed by the power steering system of FIG. 1.

DETAILED DESCRIPTION OF THE PREFERRED EMBODIMENT

Referring to FIG. 1, an electric motor-driven type power steering system 1 according to an embodiment of the present invention includes an electric motor 2, a steering gear 3, an actuator 4 for actuating the motor 2, a control circuit 5 having a function of CPU (central processing unit) for controlling the operation of the motor 2 in accordance with a control routine which will be described hereinlater with reference to FIG. 2, and a warning means 6 which, in this embodiment, is constituted by a warning lamp.

The steering gear 3 consists of a drive shaft 7 connected to a steering wheel 15, a pinion gear 8 formed integral with the drive shaft 7 and a rack 9 driven by the pinion gear 8 for transmitting a steering force to vehicle wheels (not shown) to steer the vehicle by way of a steering linkage (not shown). A worm gear 10 is axially aligned with an output shaft (not shown) of the motor 2 and drivingly connected to same. The worm gear 10 is meshed with a worm wheel 11 which is fixedly and concentrically installed on the drive shaft 7 for transmitting a driving force produced by the motor 2 to the drive shaft 7.

The power steering system 1 further includes a vehicle speed sensor 12, a steering effort sensor 13, and a steering wheel rotational angle sensor 14. The vehicle speed sensor 12 detects a vehicle speed and supplies a signal representative thereof to the control circuit 5. The steering effort sensor 13 detects a steering torque or effort applied to the steering wheel 15 and supplies a signal representative thereof to the control circuit 5. The steering wheel rotational angle sensor 14 detects a rotational angle of the steering wheel 15 and supplies a signal representative thereof to the control circuit 5.

The control circuit 5 is adapted to judge whether an associated vehicle is in a straight-ahead running condition on the basis of the signal from the steering wheel rotational angle sensor 14. The control circuit 5 is also adapted to judge that a malfunction of the motor 2, steering gear 3, etc. has been caused when the steering effort detected by the steering effort sensor 13 is larger than a predetermined value which is determined on the basis of the vehicle speed detected by the vehicle speed sensor 12 since such an abnormally large steering effort shall inevitably be caused by a malfunction of the motor 2, steering gear 3, etc. The control circuit 5 then causes the warning lamp 6 to be turned on and off alternately for instance for thereby giving to the driver a warning on the fact that a malfunction has been caused and its fail-safe mechanism is going to be put into action. Thereafter, the control circuit 5 causes, by way of the actuator 4, the motor 2 to produce a gradually decreasing steering assist force. The control routine for this gradual decrease of steering assist force in this embodiment will be described with reference to FIG. 2.

Referring to FIG. 2, firstly at step S1 preparation for detection of malfunction is made in accordance with a malfunction detecting mode and the signals from the vehicle speed sensor 12, the steering effort sensor 13, and the steering wheel rotational angle sensor 14. At step S2, judgment on malfunction is made. When it is judged that a malfunction has been caused, the control proceeds to step S3 and step S4. At step S3 the warning lamp 6 is turned on or turned on and off alternately, and at the same time at step S4 the supply of current to the motor 2 by way of the motor actuator 4 is varied so as to cause the steering assist force to fluctuate or increase and decrease cyclically or the motor 2 is turned on and off repeatedly to cause the steering assist force to fluctuate or increase and decrease cyclically. The fluctuations or variations of the steering assist force are transmitted to the steering wheel 15 to cause its abnormal vibrations, whereby the driver who puts his hands on the steering wheel 15 can assuredly feel the abnormal vibrations of the steering wheel 15.

In this manner, by the warning by means of the warning lamp 6 at step S3 and by the warning by means of the abnormal vibrations of the steering wheel 15 at step S4, it becomes possible to assuredly make the driver notice the fact that a malfunction has been caused in the power steering system 1. Then, at step S6 the steering assist force (assist gain) by the motor 2 is decreased gradually, and at step S7 the motor 2 is stopped or an electromagnetic clutch (not shown) connecting between the motor 2 and the steering gear 3 is turned off to be disengaged for thereby stopping supply of the steering assist force to the steering gear 3.

While the power steering system according to an embodiment of the present invention has been described and shown as above, it is not for the purpose of limitation. For example, the warning lamp can be replaced by a device for producing a warning sound or both a warning lamp and a sounding device can be used jointly to this end. Further, the warning by the above described warning device or devices can be continued even after the supply of the steering assist force has been stopped, so that the warning is continued until the driver turns off the warning device or makes some reactions against the malfunction having been caused.

Further, an electric motor for assist of steering force can be replaced by a hydraulic pump.

What is claimed is:

1. A power steering system comprising:
   a steering gear to which a steering effort is applied by way of a steering wheel;
   assist power source means connected to said steering gear for supplying thereto a steering assist force for thereby multiplying said steering effort;
   detector means for detecting said steering effort applied to said steering gear by way of said steering wheel and producing a signal representative thereof;
   control means connected to said steering assist means and said detector means for controlling increase and decrease of said steering assist force in response to the signal from said detector means and having means for detecting a malfunction of said steering gear and said steering assist means; and
   warning means connected to Said control means for issuing a warning upon detection of said malfunction by said control means;
   said control means having a control mode for causing said assist power source means to produce a cyclically varying steering assist force upon detection of said malfunction so that said cyclic variation of said steering assist force is transmitted to said steering wheel and thereafter causing said assist power source means to produce a gradually decreasing steering assist force.

2. A power steering system for a vehicle, comprising:
   a steering wheel;
   a steering gear connected to said steering wheel for receiving therefrom a steering effort;
   steering assist means connected to said steering gear for supplying thereto a steering assist force for thereby multiplying said steering effort;
   detector means for detecting said steering effort transmitted from said steering wheel to said steering gear and producing a signal representative thereof;
   control means connected to said steering assist means and said detector means for controlling increase and decrease of said steering assist force in response to the signal from said detector means and having means for detecting a malfunction of said steering assist means; and
   warning means connected to said control means for issuing a warning upon detection of said malfunction by said control means;
   said control means including means for causing said steering assist means to produce a cyclically varying steering assist force upon detection of said malfunction so that vibrations of said steering wheel due to said cyclically varying steering assist force are caused and thereafter causing said steering assist means to gradually reduce said auxiliary steering force.

3. A power steering system according to claim 2, wherein said control means further includes means for judging that said malfunction has occurred when said steering effort detected by said detector means is larger than a predetermined value under a straight-ahead vehicle running condition.

4. A power steering system according to claim 3, further comprising second detector means for detecting a vehicle speed and supplying a signal representative thereof to said control means, and third detector means for detecting a rotational angle of said steering wheel and supplying a signal representative thereof to said control means, said control means making judgment on the vehicle running condition on the basis of said signals from said second and third detector means.

5. A power steering system according to claim 2, wherein said control means further includes means for stopping said steering assist means supplying said steering assist force to said steering gear after said gradual reduction of said steering assist force.

6. A power steering system according to claim 2, wherein said warning means comprises a warning lamp which is turned on upon detection of said malfunction by said control means.

7. A power steering system according to claim 2, wherein said warning means comprises a warning lamp which is turned on and off alternately upon detection of said malfunction by said control means.

8. A power steering system according to claim 2, wherein said steering assist means comprises an electric motor, and said control means further includes means for cyclically changing supply of current to said motor for attaining said cyclic variation of said steering assist force.

* * * * *